Nov. 11, 1947.  J. H. CATLIN  2,430,802
AUXILIARY HAND GRIP FOR SHOVELS
Filed Aug. 6, 1945
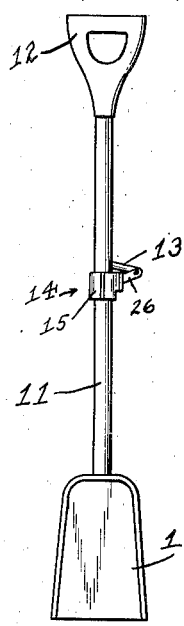
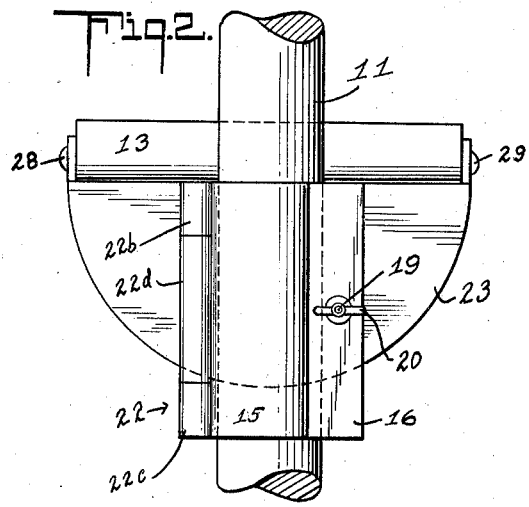
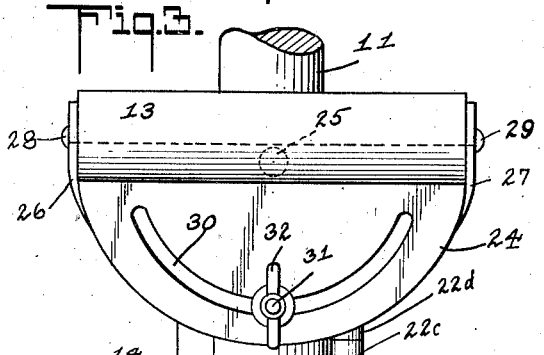
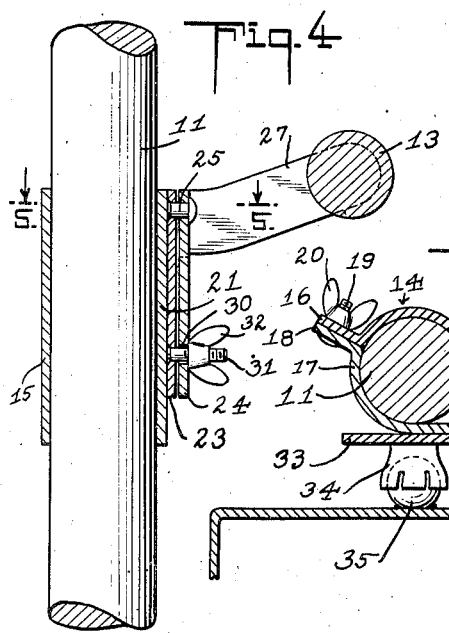
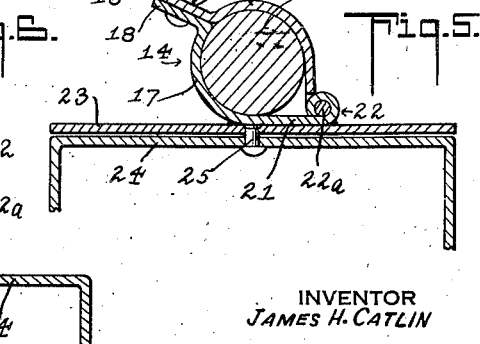
INVENTOR
JAMES H. CATLIN
BY
H. G. Manning
ATTORNEY Patented Nov. 11, 1947

2,430,802

UNITED STATES PATENT OFFICE 2,430,802

AUXILIARY HAND GRIP FOR SHOVELS

James H. Catlin, Litchfield, Conn.

Application August 6, 1945, Serial No. 609,179

4 Claims. (Cl. 294—58)

This invention relates to shovels, and more particularly to an auxiliary hand grip which may be adjustably clamped at any desired height along the handle shank.

One object of the present invention is to provide an auxiliary hand grip of the above nature which may be twisted to any angle around a horizontal axis, and also swung around the vertical axis of the handle shank.

A further object is to provide an auxiliary hand grip of the above nature which may be held in any desired angular position by means of a universal ball and socket connection to the handle shank clamp.

A further object is to provide a device of the above nature which will be simple in construction, inexpensive to manufacture, easy to install and manipulate, compact, ornamental in appearance, and very efficient and durable in use.

With these and other objects in view, there have been illustrated on the accompanying drawing two forms in which the invention may conveniently be embodied in practice.

In the drawing,

Fig. 1 represents a front view in elevation of a shovel showing the auxiliary hand grip as it appears when attached to an intermediate point of the shovel shank.

Fig. 2 is a fragmentary rear view of the auxiliary hand grip and a portion of the shovel handle shank, shown on a larger scale.

Fig. 3 is a fragmentary view similar to Fig. 2, looking at the front of the shovel hand grip.

Fig. 4 is a side longitudinal sectional view of the same, taken along the line 4—4 of Fig. 3, looking in the direction of the arrows.

Fig. 5 is a cross-sectional view of the same, taken along the line 5—5 of Fig. 4.

Fig. 6 is a similar cross-sectional view of a modified form of the invention, in which the auxiliary hand grip is connected by a universal ball and socket joint to the handle shank clamp.

Referring now to the drawing, in which like reference numerals denote corresponding parts throughout the several views, the numeral 10 indicates the shovel scoop which is secured to the lower end of an elongated handle shank 11 having on its upper end the usual D-shaped hand grip 12.

Provision is also made of an auxiliary intermediate shiftable hand grip 13 which is adjustably connected to the shank 11 by means of a two-part clamp generally indicated by the numeral 14, which consists of a rear semi-cylindrical clamp member 15 having a flat outer end 16, and a front semi-cylindrical clamp member 17 having a flat outer end 18. The flat ends 16 and 18 are adapted to be connected together by a bolt 19 having a thumb nut 20 screwed thereon. The rear of the clamp members 15 and 17 are pivotally secured together by means of a vertical hinge generally indicated by the numeral 22, and comprising an elongated pin 22a passing through a pair of loops 22b, 22c on the clamping member 17, and a single central loop 22d on the clamping member 15.

The rear clamping member 17 is provided with a flat inner section 21 which is adapted to be soldered or otherwise secured to a semi-circular vertical base plate 23.

In order to permit the auxiliary hand grip 13 to be shifted about a horizontal axis, provision is made of a U-shaped bracket 24 which is pivotally secured to the base plate 23 by means of a horizontal pivot pin 25. The hand grip 13 is secured in place between a pair of side arms 26, 27 by a part of attaching nails 28, 29, as clearly shown in Figs. 2 and 3.

In order to provide for the adjustment of the U-shaped bracket 24 around the axis of the pivot pin 25, provision is made of an arcuate slot 30 concentric with said pivot pin 25, and through which passes a horizontal headed bolt 31 upon the outer end of which is secured a thumb nut 32.

Operation

In operation, the two-part clamp 14 will first be attached to the elongated shank 11 and clamped at any desired height and angle about the axis thereof by means of the bolt 19 and thumb nut 20. The handle grip 13 may then be adjusted around the horizontal axis of the pivot pin 25 by swinging the U-shaped bracket 24 about said pivot pin to the desired angular position, and then clamping it by means of the bolt 31 and thumb nut 32.

Modified form

In the modified form of the invention, provision is made of a base plate 33 of rectangular shape, and having secured thereto, as by soldering, a spherical socket 34 which is adapted to have a universal angular connection with a ball 35 secured as by welding to the adjustable bracket 24.

While there have been disclosed in this specification two forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an auxiliary hand grip to be attached at an intermediate point in the length of an elongated shovel handle shank, a two-part clamp for embracing said shank, a base plate secured to one of the parts of said two-part clamp, a U-shaped bracket pivotally connected to said base plate and having a hand grip supported thereby, said bracket having an arcuate slot concentric with the pivotal connection thereof with said base plate, and means extending through said slot for clamping said shiftable bracket to said base plate.

2. The invention as defined in claim 1, in which said clamping means comprises a cooperating bolt and a nut.

3. The invention defined in claim 1, in which bolt and nut means are provided for rigidly holding the parts of said clamp upon said shank.

4. In an auxiliary hand grip to be attached at an intermediate point in the length of an elongated shovel handle shank, a two-part clamp for embracing said shank, a base plate secured to one of the parts of said two-part clamp, a U-shaped bracket pivotally connected to said base plate on a horizontal axis and having a hand grip supported thereby, said bracket having an arcuate slot concentric with the pivotal connection thereof with said base plate, and means extending through said slot for clamping said shiftable bracket to said base plate.

JAMES H. CATLIN.

REFERENCES CITED

The following references are of record in the file of this patent:

UNITED STATES PATENTS

| Number | Name | Date |
|---|---|---|
| 842,912 | Rundell | Feb. 5, 1907 |
| 1,083,054 | Brown | Dec. 30, 1913 |
| 1,534,075 | Parrish | Apr. 21, 1925 |
| 1,586,056 | Walsh | May 25, 1926 |